UNITED STATES PATENT OFFICE.

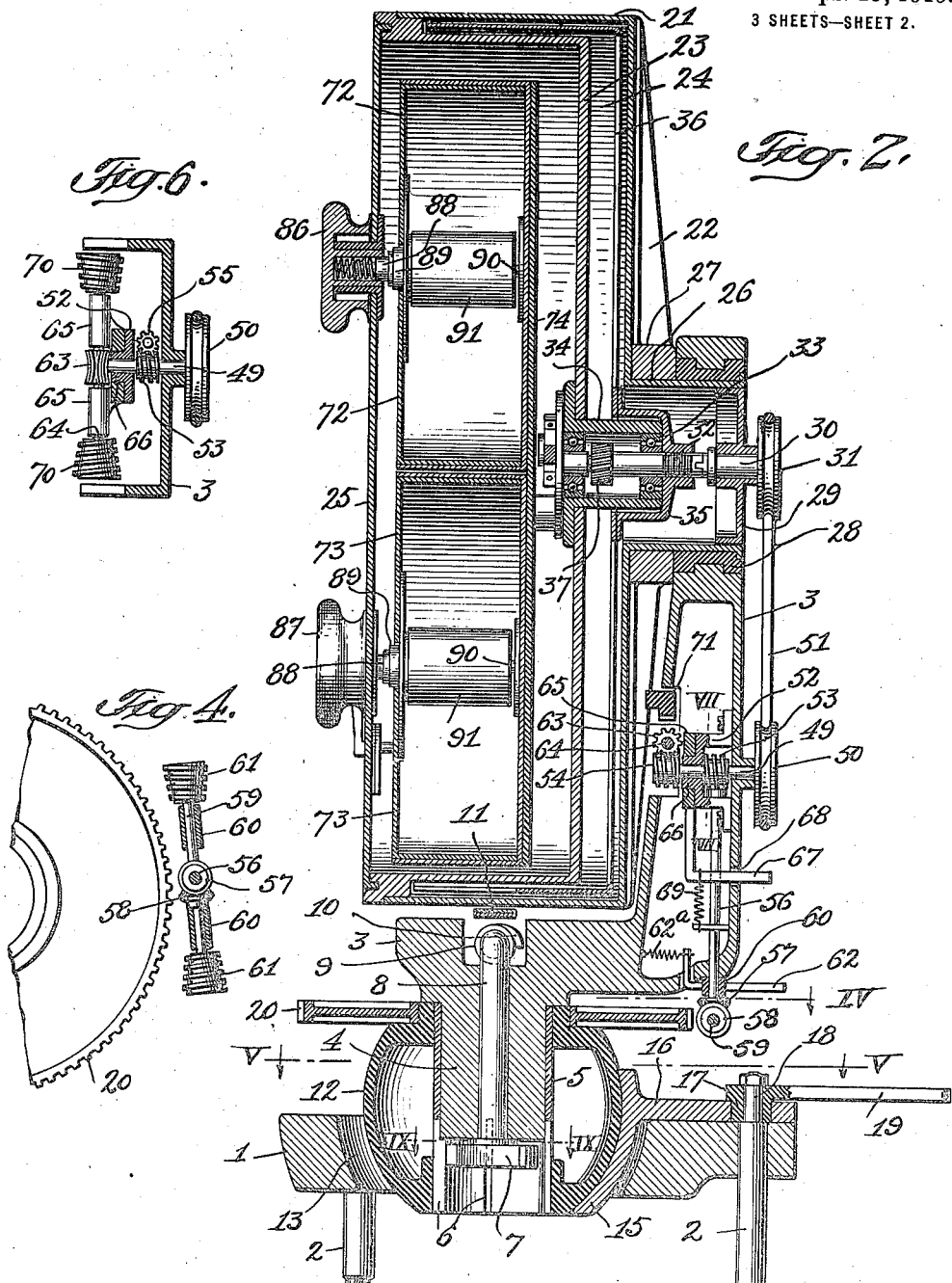

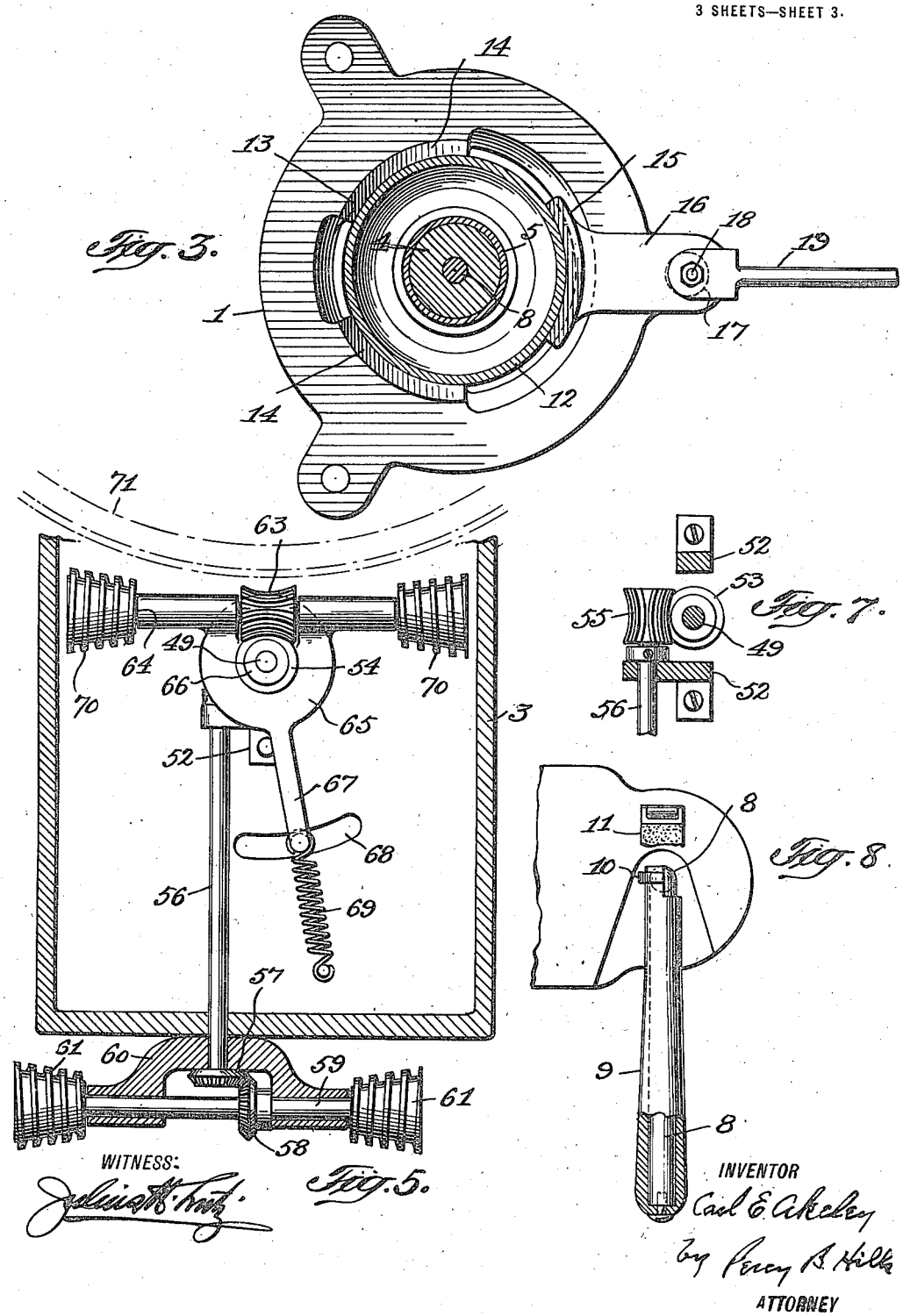

CARL E. AKELEY, OF NEW YORK, N. Y., ASSIGNOR TO AKELEY CAMERA INC., OF NEW YORK, N. Y., A CORPORATION OF NEW YORK.

SUPPORT FOR MOTION-PICTURE CAMERAS AND THE LIKE.

1,300,805. Specification of Letters Patent. Patented Apr. 15, 1919.

Application filed May 8, 1916. Serial No. 96,197.

*To all whom it may concern:*

Be it known that I, CARL E. AKELEY, a citizen of the United States, residing at New York, in the borough of Manhattan, city of New York, and State of New York, have invented certain new and useful Improvements in Supports for Motion-Picture Cameras and the like, of which the following is a specification.

My invention relates to supports for certain devices, such as motion picture cameras, and more particularly of the general type disclosed in Letters Patent No. 1,181,201, granted to my assignee May 2, 1916, and has for its object to provide certain improvements in the construction of the same as will be hereinafter more definitely pointed out and claimed, reference being had to the accompanying drawings, in which:—

Fig. 2 is a central vertical transverse sectional view of the camera and its support.

Fig. 3 is a horizontal sectional view taken on the line III—III of Fig. 2.

Fig. 4 is a horizontal detail sectional view, taken on the line IV—IV of Fig. 3.

Fig. 5 is an enlarged detail vertical sectional view, showing the mechanism for rotating and for tilting the camera casing.

Fig. 6 is a horizontal detail sectional view of the mechanism for tilting the camera casing.

Fig. 7 is a detail vertical sectional view, taken on the line VII—VII of Fig. 2.

Fig. 8 is a detail top plan view partly in section of the base locking handle.

Fig. 9 is a detail horizontal sectional view taken on the line IX—IX of Fig. 2.

Similar numerals of reference denote corresponding parts in the several views.

Figure 1:
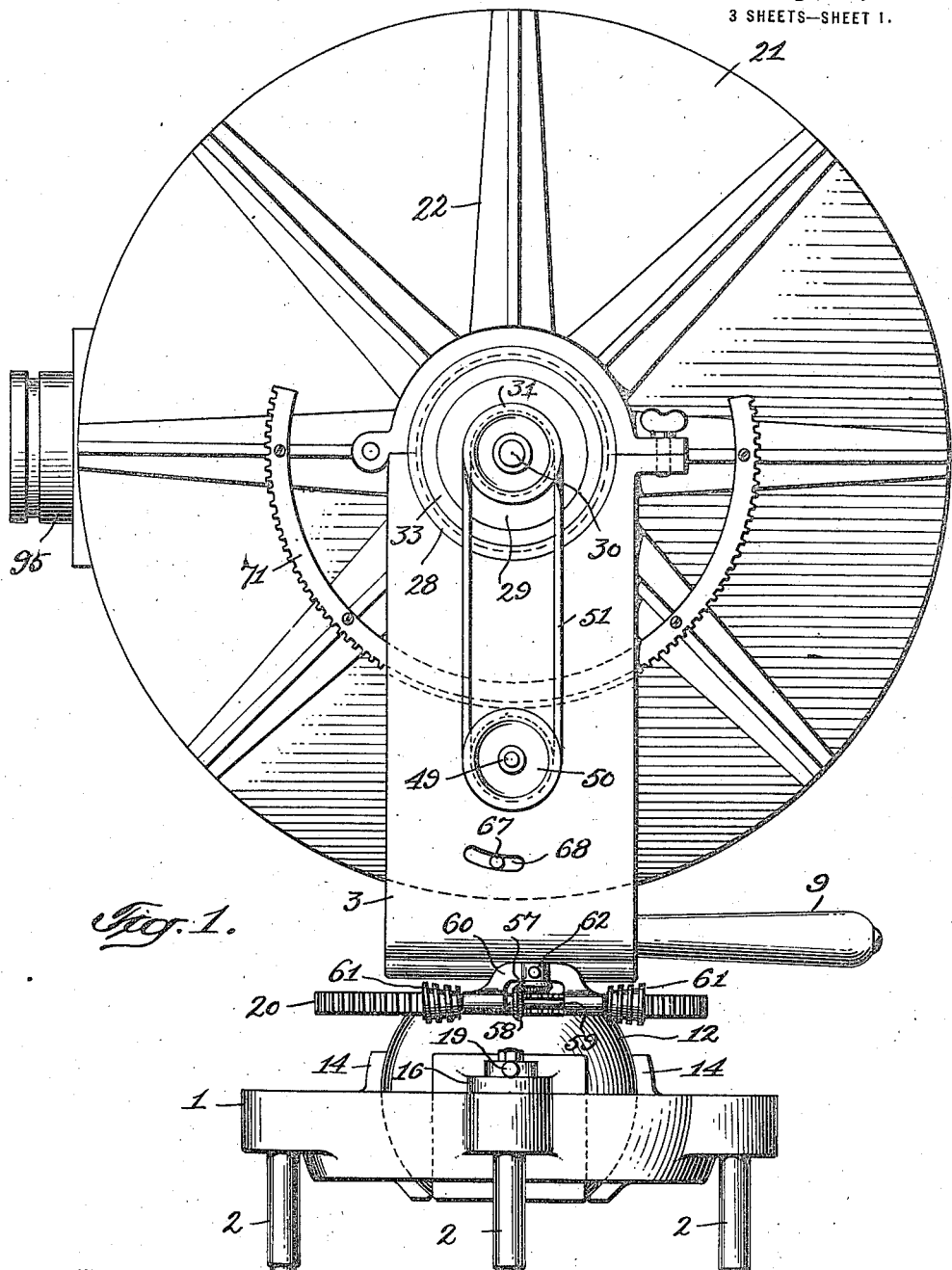
Figure 1 is a side elevation of my improved camera and its base.

In the said drawings, the reference numeral 1 denotes a base, supported by suitable legs 2 which are adapted to rest upon any suitable support, or may be fitted into the top plate of a tripod. A casting 3, preferably of aluminum, has a depending extension 4, which has fixed thereto a tube 5, preferably of steel, and which is split at its lower end at 6, whereby it may be expanded by means of a cam plate 7 mounted upon the lower end of a bent rod 8 passing upward centrally through the extension 4 and projecting to one side thereof, as seen in detail in Fig. 10. Mounted upon the horizontal projecting portion of said rod is a handle or sleeve 9 rotatable thereon, and provided at its inner ends with a cam 10 that is adapted to be rotated into engagement with a spring friction plate 11, which is forced thereby against the outer wall of the camera casing hereinafter described to lock said casing against rotation. The slitted end 6 of tube 5 is adapted to be forced against the interior wall of a spherical member 12, which is mounted upon the tube 5, the latter being rotatable therein, said spherical member 12 being disposed in a similarly shaped recess 13 in the base 1, and being adjustably maintained therein by two fixed jaws 14 and a movable jaw 15, said jaw 15 having an arm 16 apertured to receive a cam 17, mounted upon a shaft 18 forming an extension of one of the legs 2, said cam being operated by a handle 19 to move said movable jaw 15 toward or away from the spherical member 12 to clamp or unclamp the latter with respect to the base 1. Fixed to the upper portion of the spherical member 12 is a gear wheel 20, the same forming part of the means whereby the tube 5 and extension 4, together with the casting 3 and the camera supported thereby, may be rotated bodily in the spherical member 12 in a manner hereinafter described.

The camera casing 21 is supported by a spider 22, preferably of aluminum, said casing 21 having an inner cylindrical box 23 spaced therefrom to form an intervening annular chamber 24, the casing 21 being closed by a removable front plate 25. The casing 21 is extended at its rear centrally into a sleeve 26 upon which the hub 27 of the spider 22 is mounted, said sleeve being mounted in a bushing 28, preferably of brass, which in turn is fixed in the casting 3, whereby said sleeve 26 and with it the camera casing 21 may be revolved in the casting 3. Mounted in the open end of the sleeve 26 is a closure 29 centrally apertured to form a bearing for a shaft 30 carrying a pulley 31 at its outer end. The inner end of said shaft 30 is squared to engage a corresponding groove in a similar shaft 32 in alinement therewith, said shaft 32 being adapted to rotate in anti-friction bearings 33 mounted in a sleeve 34, which is fixed in the cylindrical box 23, as best seen in Figs. 3 and 4. Keyed to said shaft 32 is a collar 35, which in turn is rigidly connected with the camera shutter 36, the latter being in the form of a cylindrical shell of the character disclosed in Letters Patent No. 1,177,764, granted to my assignee March 28, 1916, and being disposed in the annular chamber 24. Said shaft 32 also has fixed thereon a gear wheel 37, which is in mesh with a larger gear wheel 38, said latter gear wheel being fixed to the end of a shaft 39 that is mounted in a suitable bearing 40 fixed to the inside of the rear wall of the cylindrical box 23. Also splined to said shaft 39 is the hub 41 of the film drive sprocket wheel 42, the latter being of the usual construction and needing no further description. The outer end of the hub 41 has fixed therein oppositely disposed pins 43 adapted to be detachably engaged by a spider 44, keyed to a shaft 45 that projects through the front plate 25 and has fixed thereto a suitable operating handle 46. Loosely mounted upon said shaft 45 is a sheave 47 having a projecting arm 48 with which the handle 46 is adapted to engage to rotate said sheave 47 with the shaft 45.

Disposed in a suitable bearing in the casting 3 below the pulley 31 is the shaft 49 of a similar pulley 50, the two pulleys being connected by a suitable belt 51 whereby the pulley 50 will be driven by the pulley 31. The shaft 49 projects into the interior of the casting 3, where it is supported by a bracket 52, and intermediate the outer wall of said casting and said bracket is provided with a worm 53, while on the inner end of said shaft, and to the other side of the bearing 52, is another worm 54. The worm 53 is in gear with a worm gear 55 mounted upon the upper end of a vertical shaft 56, which in turn extends through the outer wall of the casting 3 near the bottom thereof and terminates in a bevel gear 57, which in turn is in mesh with a bevel gear 58 fixed to a horizontal shaft 59 intermediate the length of the latter, said shaft 59 being supported in movable bearings 60 and carrying at its outer ends worms 61 adapted to be brought alternately into mesh with the gear wheel 20 hereinbefore described. To control the position of the shaft 59 and its worms 61, I provide a bent lever 62 fixed to the bearing 60, said bearing being pivoted upon the vertical shaft 56, as best seen in Fig. 7, and said lever 62 and bearing 60 being retained in a median position by a coiled spring 62ª. By moving the lever 62 horizontally, I am enabled to bring either of the worms 61 as desired into engagement with the gear wheel 20 in a manner readily understood. The worm 54 on the inner end of the shaft 49 is in mesh with a worm gear 63 fixed to a horizontal shaft 64 intermediate the length of the latter, said shaft being supported in a bearing 65 rotatable upon a hub 66 projecting from the bearing 52, said bearing 65 having projecting therefrom a bent lever 67 whose lower horizontal end projects through a slot 68 in the outer wall of the casting 3, as best seen in Figs. 3 and 7, said arm 67 and bearings 65 being retained in a median position by a suitable coiled spring 69. The shaft 64 has fixed at its outer ends suitable worms 70 adapted alternately to be brought into engagement with a toothed sector 71 fixed to the spider 22, as best seen in Fig. 7, it being understood that with the bearing 65 in the median position shown in Fig. 7, neither of said worms is in engagement with said toothed segment.

From the above description, the operation of my improved construction will be understood to be as follows:—The legs 2 of the base 1 are placed upon a tripod or other suitable support, and when it is desired to adjust the camera as a whole on said base, this may be accomplished by shifting the cam 17 through the handle 19, which will adjust the movable jaw 15 away from the spherical member 12, thereby releasing the latter and permitting the camera as a whole to be adjusted to any desired position on the base 1, whereupon by again tightening the cam 17 the spherical member 12 will be locked in its adjusted position. If it is desired to take a series of pictures with the camera fixed in this position, sleeve 9 is rotated upon the bent rod 8 to bring the cam 10 in engagement with the spring friction plate 11 and force the latter against the camera casing 21, which will lock said casing against rotary movement. By also turning the bent rod 8 to the right, the split lower end 6 of the tube 5 will be expanded by the cam plate 7 into engagement with the spherical member 12, thereby locking the depending extension 4 of the casting 3 against rotary movement in said spherical member 12, which thus locks the extension 4 against rotation, and the camera casing against movement in any direction. It will be observed that through the tension of springs 62ª and 69 both of the sets of worms 61 and 70 are maintained in an intermediate position, whereby none of them are in engagement with their respective gears 20 or 71, so that during the operation of the camera under these conditions, these parts will be out of operation. But if it is desired, say, to swing the camera horizontally to take a panoramic view, by moving the bent rod 8 to the left the cam plate 7 will be adjusted to release the split lower end 6, whereby the camera as a whole will be free to rotate in a vertical axis upon the extension 4 of the casting 3. By now moving the lever 62 to the right or left, as may be desired, against the tension of its spring 62ª, one or the other of the worms 61 will be brought into mesh with the gear wheel 20, and through the rotation of the shaft 58 in a manner hereinafter described, which is imparted to said worms, the latter will creep upon said fixed gear wheel 20 and thereby rotate the casting 3 upon the extension 4, which will carry with it the camera as a whole, rotating the same to the right or left as may be desired. If it is desired to rotate the camera on a horizontal axis, the sleeve 9 will be turned to release the cam 10 from the spring plate 11, thereby releasing the camera casing 21 so that it is free to rotate in the casting 3 upon the sleeve 26 as a hub. By now adjusting the bent lever 67 to the right or left against the tension of its spring 69, one or the other of the worms 70 will be brought into engagement with the toothed sector 71, thereby transmitting motion in one direction or the other to said sector and through it and the spider 22 to the camera casing, it being understood that the shaft 64 carrying the worms 70 is driven from shaft 49 in a manner now to be described.

Having thus described my invention, what I claim as new and desire to secure by Letters Patent, is:—

1. The combination with a motion picture camera casing, and a casting in which said casing is mounted adjustably on a horizontal axis, of a base, a universal connection between said casting and said base, and a separate connection between said casting and said base for permitting said casting to be adjusted on a vertical axis.

2. The combination with a motion picture camera casing and a casting in which said casing is mounted, of a base, a vertical extension at the bottom of said casting projecting into said base, a sleeve fixed to said vertical extension and forming a pivotal bearing between said extension and said base, a gear wheel fixed to said base, worms adjustably mounted on said casting in proximity to said gear wheel and normally retained out of mesh therewith, means for moving said worms manually into mesh with said gear wheel, and connections between said worms and the operative mechanism of the camera for rotating said worms during the operation of the camera.

3. In a motion picture camera, a base, a camera casing, a casting supporting said camera casing and projecting into said base to form a vertical pivotal support therein, a split member between said casting and said base, and means for expanding said split member to lock said casting to said base.

4. In a motion picture camera, a base, a camera casing, a casting in which said camera casing is mounted, a vertical extension at the bottom of said casting projecting into said base, a sleeve fixed to said vertical extension and forming a pivotal bearing between said extension and said base, said sleeve being split at its lower end in engagement with said base, and a cam plate for expanding said split end to clamp it to said base.

5. In a motion picture camera, a base, a camera casing, a casting in which said camera casing is mounted rotatably on a horizontal axis, said casting being rotatably mounted on a vertical axis in said base, and means for locking said casing against rotation in said casting and said casting against rotation in said base.

6. In a motion picture camera, a base, a camera casing, a casting in which said camera casing is mounted rotatably on a horizontal axis, said casting being mounted rotatably on a vertical axis in said base, and a common means for locking said casing against rotation in said casting and said casting against rotation on said vertical axis in said base.

7. In a camera, a base, a camera casing, a spherical member mounted at the lower portion of said casing, fixed jaws in said base shaped to conform to said spherical member and receiving the same, a similar but adjustable jaw also engaging said spherical member, and a cam for clamping said adjusting jaw against said spherical member to lock it in any adjusted position.

In testimony whereof, I have hereunto set my hand this 3rd day of May, 1916.

CARL E. AKELEY.